Patented Dec. 23, 1952

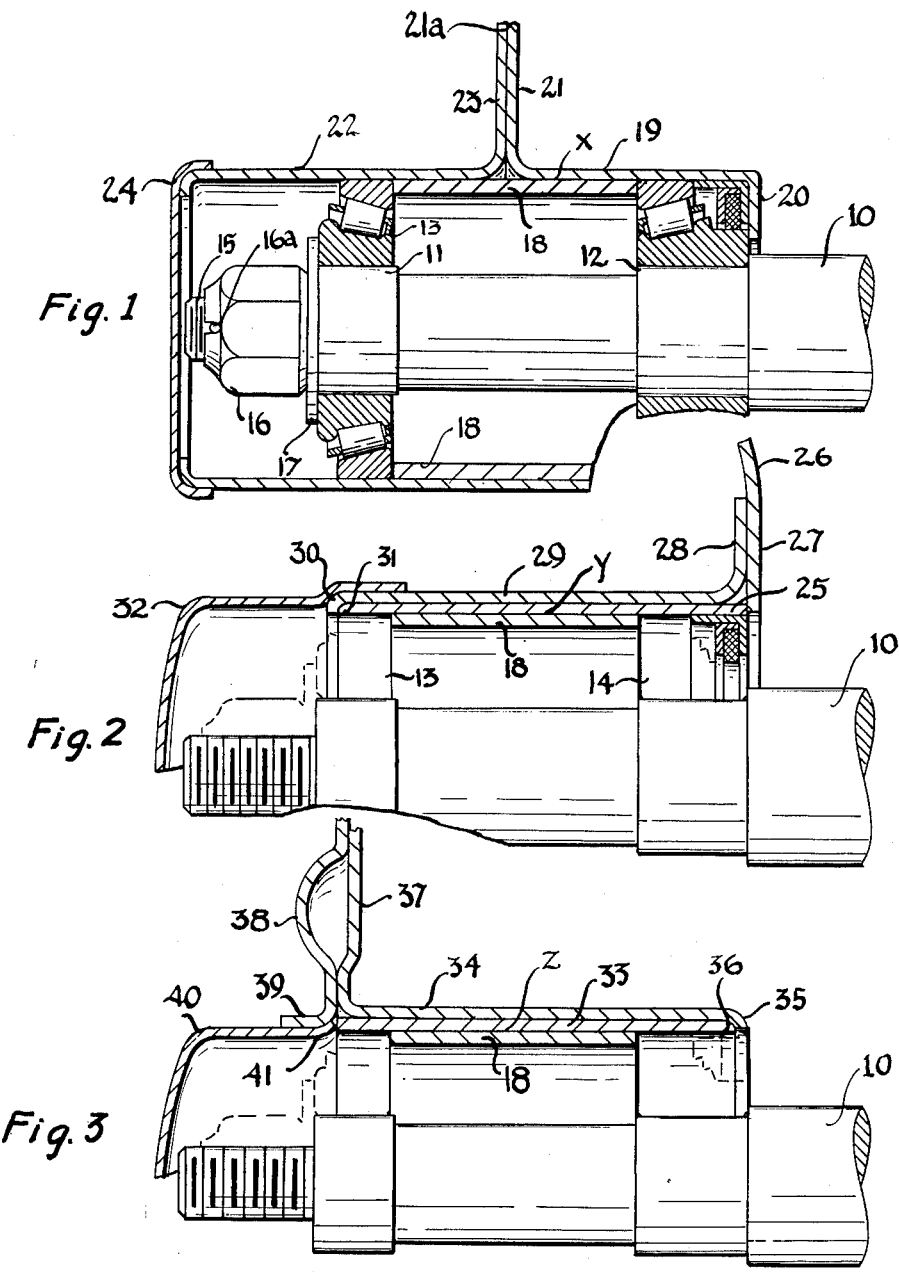

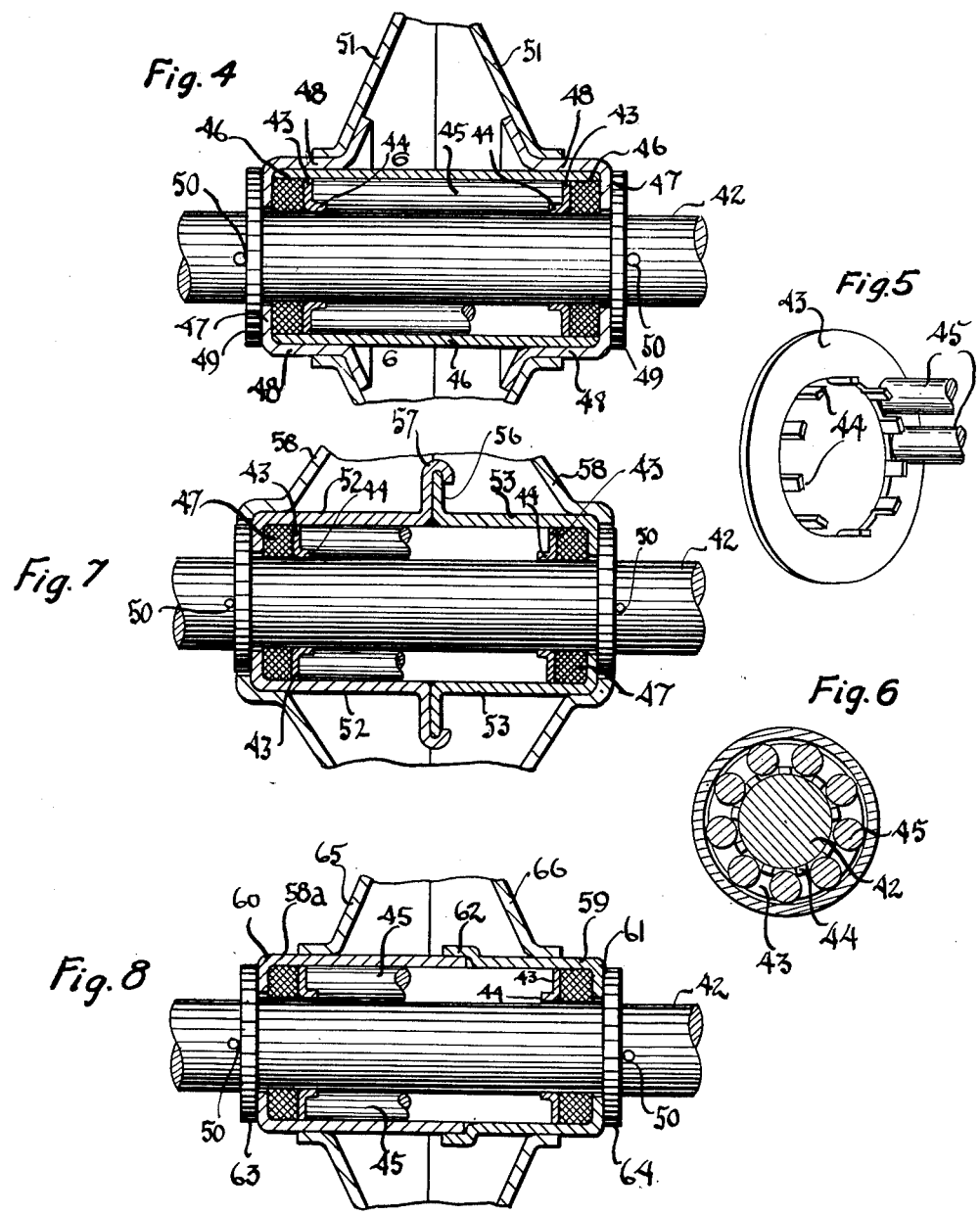

2,622,934

UNITED STATES PATENT OFFICE 2,622,934

HUB CONSTRUCTION FOR WHEELS

Ross William Phelps, Orillia, Ontario, Canada

Application July 19, 1947, Serial No. 762,098

2 Claims. (Cl. 301—105)

This invention relates to improvements in hub constructions for wheels.

It is an object of the present invention to provide a hub construction for wheels which may be easily and cheaply assembled, and which may be disassembled with ease for servicing.

Another object of the present invention is to provide a hub construction which is economical to manufacture, due to the wide use of stampings which enables the machining operations to be kept to a minimum and avoids any complicated casting.

A further object of the invention is to provide wheel hub constructions employing enclosed wheel-supporting races which are easily removable along the remainder of the wheel assembly when servicing or maintenance is required.

Previous practice in the production of hubs of the roller-bearing class has been to build the wheel around a cage in which the rollers are held by some mechanical device incorporated in the cage itself.

Such schemes have yielded an effective hub, but their manufacture has been expensive due to the need for an elaborate system of stamping, intricate casting or extensive machining.

It is therefore another object of the present invention to provide a wheel hub construction of the roller-bearing class which may be economically manufactured due to the introduction of a simple roller-bearing retaining means.

With these and other objects in view the invention generally comprises a hub construction for wheels having an axle, at least one wheel-supporting bearing race, a plurality of stampings designed to maintain said race relative to said axle, and radially extending flanges attached to said stampings forming means for supporting a web-wheel structure.

Other objects of the invention will be made apparent through a study of the following detailed specification taken in conjunction with the accompanying drawings.

In the drawings:

Figure 1 is a cut-away view of one form of hub construction according to my invention.

Figure 2 is a cut-away view of a modified form of the hub construction indicated in Figure 1.

Figure 3 is a cut-away view of a further alternative form of the hub construction indicated in Figure 1.

Figure 4 is a cut-away view of a form of hub construction according to my invention applied to give a cage-type roller-bearing hub, the roller-bearings being held by a novel retainer.

Figure 5 is an enlarged perspective view of the novel retainer used in the form of hub construction indicated by Figure 4.

Figure 6 is a cross-sectional view taken along the line 6—6 in Figure 4.

Figure 7 is a cut-away view of a modified form of the hub construction indicated in Figure 4.

Figure 8 is a further alternative form of the hub construction indicated in Figure 4.

Referring to the drawings, and particularly to Figure 1, an axle 10 has reduced diameter portions 11 and 12 carrying bearing races 13 and 14 in which the bearings are about 70% thrust and 100% load. The axle 10 carries a threaded portion 15 on its outer end mounting the wheel nut 16, which operatively engages the bearing 13 by means of annular washer 17 as shown and may be pin-held by a pin 16a.

A spacer 18, preferably of precision formed steel, relatively locates the bearings 13 and 14, but it will be understood that alternatives are possible here depending upon the type of bearing used so long as the bearing-race structure is mountable on the axle by tightening the wheel nut 16.

A stamped sleeve 19 extends partially over the bearing-race 14 by the lip 20 and extends outwardly in the radial flange 21 to form one element of the web structure 21a leading to the rim of the wheel. A stamped sleeve 22 similarly encloses the remaining portion of the bearing assembly and has the flange 23 extending radially to form the remaining cooperating portion of the web element 21a. The flanges 21 and 23 may be spot-welded or bolted together as desired. Further the sleeve 19 may be spot-welded to the spacer 18 as at X if desired and in such instance the lip 20 of the sleeve 19 may be eliminated if desired. A suitable stamped cover 24 is shown removably fastened to the sleeve 22 to prevent dust from entering into the bearings.

It is apparent that the wheel construction described may be easily assembled from low cost stampings. Thus, the sleeve 19 and spacer 18 should first be fastened together by spot-welding as at X either after the bearing-race 14 has been inserted therein, or if the lip 20 is not present on the sleeve 19, these two elements may be fastened together without regard to bearing-race 14. Assuming the construction indicated, however, the bearing race 14, the sleeve 19 and spacer 18 are then slipped on the shaft 10 and the bearing-race 13 mounted on the shaft engaging the spacer 18. The nut 16 may then be threaded on the shaft to engage the bearing-race 13 by the washer 17 and to hold the assembly together, and then pin 16a or other locking means may be applied to keep the nut in place. Thereafter the sleeve 22 is slipped over the assembly along with the cover 24 if desired and the flanges 23 and 21 bolted together or welded if a permanent structure is desired.

Referring to Figure 2, an alternative form is shown which in essence includes the utilization of a stamped secondary shell 25 enclosing the bearing-races 13 and 14 and the spacer 18, and serving to determine the length of the retaining mechanism. The web 26 of the wheel in this instance is formed by the stamped disc 27 and is supported by the flange 28 of the stamped sleeve 29. The sleeve 29 is lipped as at 30 to engage the end 31 of the secondary shell 25. The secondary shell and the spacer 18 may be spot-welded as at Y before assembly and since it is intended that the flange 28 and disc 27 be either bolted or welded together no further fixture is necessary. Other features are as formely described with reference to the structure of Figure 1 with the exception that the cover 32 is of slightly different form, but, nevertheless, serves the same purpose as the cover 24 of the former type.

A further alternative and modification is evident in Figure 3 and in essence is substantially the equivalent of the device of Figure 2 with certain exceptions. Here the spacer 18 and the stamped secondary shell 33 are welded together as at Z in the manner formerly described. The stamped outer shell 34 is lipped as at 35 to engage the end 36 of the shell 33. The stamped shell 34 has a flange 37 and a cooperating annular ring member 38 mounted in conjunction therewith by bolting or welding as desired in the manner formerly described to constitute a web structure leading to the rim (not shown) of a wheel. The ring member 38 has a sleeve-like projection 39 designed to receive the cover 40 flared as at 41 to provide a locking function in cooperation therewith.

Figures 4, 7, and 8 show a form of the hub construction according to my invention particularly designed for use with wheel-barrows, but which may be effectively used on other wheeled vehicles.

Referring particularly to Figure 4, an axle 42 has two stamped roller-retainers 43 of circular cross-section mounted thereon. Roller-retainers 43 are provided with projecting lugs 44 designed to locate a plurality of rollers 45. Rollers 45 are positioned by means of the roller-retainers and a stamped, hollow, cylindrical sleeve 46. Suitable packing material 47, in the form of a thick annular washer is placed at each outer end, and a reinforcing sleeve 48 is slipped on each end of the axle to operatively engage roller-retainers 43, sleeve 46, and packing 47. A washer 49 is then slipped along each end of the axle and made to bear flushly against reinforcing sleeves 48. Washers 49 are pin-held by pins 50 so as to mount the whole assembly in fixed relation axially on the axle. Stamped flanges 51 are then attached to reinforcing sleeves 48 to form supporting means for a wheel structure (not shown).

Figure 7 shows a modification of the hub construction of Figure 4. In the construction of Figure 7, roller-retainers 43, lugs 44, rollers 45, and packing 47 are used as in Figure 4, and these parts are enclosed by a stamping 52 and a cooperating stamping 53. Lips 54 and 55 are formed on stampings 52 and 53 respectively, the said lips being designed to cause packing 47 to bear flushly against the outer surfaces of the roller-retainers 43, and stamping 53 has a radially extending flange 56 which is engaged by a turned over flange 57 extending from stamping 52. Two stampings 58 are then slipped along each end of the axle, the said stampings being formed so as to serve not only as a washer, but also as a reinforcing sleeve and supporting means for a wheel structure (not shown). Pins 50 are again used to mount the whole assembly in fixed relation axially on the axle.

Figure 8 shows a still further modification of the hub construction of Figure 4. In the construction of Figure 8 roller-retainers 43, lugs 44, rollers 45 and packing 47 are used as in Figure 4, and these parts are enclosed by a stamping 58a and a cooperating stamping 59. Lips 60 and 61 are formed on stampings 58a and 59 respectively, the said lips being designed to cause packing 47 to bear flushly against the outer surfaces of the roller-retainers 43, and stamping 59 has a raised portion 62 designed to overlie stamping 58a and form a locking means therewith.

Washers 63 and 64 are slipped along the axle and made to bear flushly against lips 60 and 61 respectively, in which position they are pin-held by means of pins 50. Flanges 65 and 66, adapted to support the wheel structure are attached to stampings 58a and 59 respectively.

It is apparent from the foregoing that I have provided a hub construction which is economical to manufacture due to the wide use of stampings, which is easily assembled, and, therefore, easily disassembled or servicing.

Replacement of worn or unserviceable bearings is seen to be a simple matter in the hub construction of my invention, especially where the flanges are attached by bolts rather than welding.

It is intended that the present disclosure should not be limited in any way other than that indicated by the scope of the following claims.

What I claim as my invention is:

1. A hub structure for mounting on the reduced diametric portion of the free end of a shaft comprising, two roller bearing assemblies each having an inner race and an outer race with bearings therebetween, the outer races of said two bearing assemblies having a similar outside diameter, a tubular spacer member having an outside sectional diameter equal to the outside diameter of the outer races of said two bearing assemblies, a tubular secondary shell having an inside diameter designed to slidably receive said outer races of said two bearing assemblies and a length greater than said spacer member, and an outer tubular shell having an inside diameter designed to slidably receive said secondary tubular shell, said outer shell being formed with a flange at one end, said flange constituting a portion of a wheel web structure, said tubular secondary shell having a length that exceeds the length of the spacer member by the combined widths of the outer races of said two bearing assemblies, said outer shell being substantially the same length as said tubular secondary shell, and said outer shell being formed with a lip to engage with said secondary shell.

2. A hub structure for mounting on the reduced diametric portion of the free end of a shaft comprising, two roller bearing assemblies each having an inner race and an outer race with bearings therebetween, the outer races of said two bearing assemblies having a similar outside diameter, a tubular spacer member having an outside sectional diameter equal to the outside diameter of the outer races of said two bearing assemblies, a tubular secondary shell having an inside diameter designed to slidably receive said outer races of said two bearing assemblies and a length greater than said spacer member, an outer tubular shell having an inside diameter designed to slidably receive said secondary tubular shell, said outer shell being formed with a flange at one end, said flange consituting a portion of a wheel web structure, and an annular reinforcing ring for cooperation with said flange on said outer shell, said tubular secondary shell having a length that exceeds the length of the spacer member by the combined widths of the outer races of said two bearing assemblies, said outer shell being substantially the same length as said tubular secondary shell, said outer shell being formed with a lip to engage with said secondary shell.

ROSS WILLIAM PHELPS.

REFERENCES CITED

The following references are of record in the file of this patent:

UNITED STATES PATENTS

| Number | Name | Date |
|---|---|---|
| 756,819 | Bicalky | Apr. 12, 1904 |
| 1,311,341 | Gallet | July 29, 1919 |
| 1,427,320 | Philips | Aug. 29, 1922 |
| 1,537,391 | Wagner | May 12, 1925 |
| 1,612,170 | Bingham | Dec. 28, 1926 |
| 2,155,916 | Weckstein | Apr. 25, 1939 |
| 2,187,777 | Garnett | Jan. 23, 1940 |
| 2,273,630 | Dunham | Feb. 17, 1942 |
| 2,391,200 | Sinclair | Dec. 18, 1945 |

FOREIGN PATENTS

| Number | Country | Date |
|---|---|---|
| 15,216 | Great Britain | 1909 |